(12) United States Patent
Matsuura et al.

(10) Patent No.: US 6,475,671 B1
(45) Date of Patent: Nov. 5, 2002

(54) HYDROGEN ABSORBING ALLOY ELECTRODE AND NICKEL-METAL HYDRIDE BATTERY

(75) Inventors: Yoshinori Matsuura, Hirakata (JP); Reizo Maeda, Kasai (JP); Katsuhiko Shinyama, Higashiosaka (JP); Tadayoshi Tanaka, Takatsuki (JP); Toshiyuki Nohma, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 37 days.

(21) Appl. No.: 09/614,137

(22) Filed: Jul. 11, 2000

(30) Foreign Application Priority Data

Jul. 13, 1999 (JP) .............................. 11-198542

(51) Int. Cl.$^7$ .......................... H01M 4/62; H01M 4/38
(52) U.S. Cl. ..................... 429/218.2; 429/217
(58) Field of Search ............... 429/218.2, 206, 429/217

(56) References Cited

U.S. PATENT DOCUMENTS 6,287,723 B1 * 9/2001 Maeda et al. ............... 429/206

FOREIGN PATENT DOCUMENTS

| JP | 10-241692 | 9/1998 | |
|---|---|---|---|
| JP | 10-241693 | 9/1998 | |
| JP | 11-025989 | 1/1999 | |
| JP | 11073967 A * | 3/1999 | ............ H01M/4/62 |

* cited by examiner

Primary Examiner—Carol Chaney
(74) Attorney, Agent, or Firm—Armstrong, Westerman & Hattori, LLP

(57) ABSTRACT

In a hydrogen absorbing alloy electrode containing hydrogen absorbing alloy powder and a binding agent, employed as the binding agent is a copolymer of aromatic vinyl and at least one of acrylic ester and methacrylic acid ester, in which the total content of acrylic ester units and methacrylic acid ester units is in the range of 43 to 90% by weight of the whole copolymer, and the hydrogen absorbing alloy electrode is used as a negative electrode of a nickel-metal hydride battery.

13 Claims, 1 Drawing Sheet

HYDROGEN ABSORBING ALLOY ELECTRODE AND NICKEL-METAL HYDRIDE BATTERY

BACKGROUND OF THE INVENTION

1. Field of the Invention

The present invention relates generally to a hydrogen absorbing alloy electrode containing hydrogen absorbing alloy powder and a binding agent and a nickel-metal hydride battery using the hydrogen absorbing alloy electrode as its negative electrode, and is particularly characterized in that the binding agent to be used in the hydrogen absorbing alloy electrode is modified so as to attain, in the nickel-metal hydride battery using the hydrogen absorbing alloy electrode as its negative electrode, an increased discharge voltage in a case where the battery is discharged at a high current as well as improved charge/discharge cycle performance.

2. Description of the Related Art

A nickel-metal hydride battery has been conventionally known as one of alkaline storage batteries. Such a nickel-metal hydride battery has been generally employed as its negative electrode a hydrogen absorbing alloy electrode using a hydrogen absorbing alloy.

In fabricating such a hydrogen absorbing alloy electrode, the method conventionally generally utilized is the one so adapted as to prepare a paste by adding a binding agent to hydrogen absorbing alloy powder and then apply the paste to a current collector composed of a punching metal or the like.

However, when the paste comprising the hydrogen absorbing alloy powder containing the binding agent added thereto is applied to the current collector as described above, contact between each hydrogen absorbing alloy powder is insufficient and further, contact between the hydrogen absorbing alloy powder and the current collector is degraded, resulting in increased resistance in a hydrogen absorbing alloy electrode. Accordingly, in a nickel-metal hydride battery employing such a hydrogen absorbing alloy electrode as its negative electrode, a discharge voltage in a case where the battery is discharged at a high current is decreased and charge/discharge cycle performance is degraded.

Therefore, in recent years, Japanese Patent Laid-Open No. Hei10(1998)-241693 has proposed to use, as a binding agent in a hydrogen absorbing alloy electrode, a copolymer of aromatic vinyl units, conjugated diene units, (meta) acrylic ester units, and functional group-containing compound units, in which the content of the (meta)acrylic ester units is in the range of 10 to 40% by weight of the whole copolymer. This binding agent serves to enhance binding between hydrogen absorbing alloy powder and a current collector in the hydrogen absorbing alloy electrode and hence, a nickel-metal hydride battery employing the hydrogen absorbing alloy electrode as its negative electrode is improved in charge/discharge cycle performance and the like.

Unfortunately however, a hydrogen absorbing alloy electrode using as a binding agent the copolymer as disclosed in the above-mentioned gazette suffers insufficient water retentivity. As a result, in a nickel-metal hydride battery employing such a hydrogen absorbing alloy electrode, there still remain problems that a discharge voltage in a case where the battery is discharged at a high current can not be sufficiently increased and that charge/discharge cycle performance is still inferior.

SUMMARY OF THE INVENTION

An object of the present invention is to enhance, in a hydrogen absorbing alloy electrode containing hydrogen absorbing alloy powder and a binding agent, the binding between each hydrogen absorbing alloy powder and between the hydrogen absorbing alloy powder and a current collector as well as water retentivity of the hydrogen absorbing alloy electrode.

Another object of the present invention is to attain, in a nickel-metal hydride battery employing the above-mentioned hydrogen absorbing alloy electrode as its negative electrode, an increased battery voltage when the battery is discharged at a high current as well as improved charge/discharge cycle performance, and to prevent a rise in internal pressure of the battery when the battery is overcharged.

A hydrogen absorbing alloy electrode according to the present invention is a hydrogen absorbing alloy electrode containing hydrogen absorbing alloy powder and a binding agent, wherein said binding agent is a copolymer of aromatic vinyl and at least one of acrylic ester and methacrylic acid ester and the total content of acrylic ester units and methacrylic acid ester units in the copolymer is in the range of 43 to 90% by weight.

The total content of acrylic ester units and methacrylic acid ester units in the above-mentioned copolymer is set in the range of 43 to 90% by weight because when the total content is less than 43% by weight, flexibility of the copolymer is degraded. If the binding agent comprising the copolymer with such degraded flexibility was used to apply hydrogen absorbing alloy powder to a current collector, it is considered that the hydrogen absorbing alloy powder is liable to fall off from the current collector and hence, binding between each hydrogen absorbing alloy powder and between the hydrogen absorbing alloy powder and the current collector is degraded, whereby resistance in a hydrogen absorbing alloy electrode is increased and an alkaline electrolyte can not be well dispersed in the hydrogen absorbing alloy electrode. On the other hand, when the total content of acrylic ester units and methacrylic acid ester units is more than 90% by weight, the copolymer is easily dissolved in an alkaline electrolyte. It is considered that when the copolymer is dissolved in the alkaline electrolyte, binding between each hydrogen absorbing alloy powder and between the hydrogen absorbing alloy powder and the current collector is degraded, whereby resistance in the hydrogen absorbing alloy electrode is increased and oxygen gas generated during overcharge can not be sufficiently absorbed in the hydrogen absorbing alloy powder.

As in the hydrogen absorbing alloy electrode according to the present invention, when the copolymer of aromatic vinyl and at least one of acrylic ester and methacrylic acid ester, in which the total content of acrylic ester units and methacrylic acid ester units is in the range of 43 to 90% by weight of the whole copolymer is used as the binding agent, sufficient contact between hydrogen absorbing alloy powder and between the hydrogen absorbing alloy powder and the current collector can be attained, so that resistance in the hydrogen absorbing alloy electrode is reduced. Further, water retentivity of the hydrogen absorbing alloy electrode is improved by the acrylic ester and/or methacrylic acid ester contained in the copolymer, and oxygen gas generated during overcharge can be sufficiently absorbed in the hydrogen absorbing alloy powder.

In a nickel-metal hydride battery employing the hydrogen absorbing alloy electrode as its negative electrode, a discharge voltage in a case where the battery is discharged at a high current is increased, charge/discharge cycle performance is improved, and internal pressure is prevented from rising when the battery is overcharged.

In the above-mentioned nickel-metal hydride battery, in order to increase the discharge voltage in a case where the battery is discharged at a high current as well as to improve the charge/discharge cycle performance, the total content of acrylic ester units and methacrylic acid ester units in the above-mentioned copolymer is preferably set in the range of 50 to 90% by weight, and more preferably 56 to 70% by weight.

Further, in the above-mentioned nickel-metal hydride battery, in order to prevent a rise in internal pressure during overcharge, the total content of acrylic ester units and methacrylic acid ester units in the above-mentioned copolymer is preferably set in the range of 46 to 70% by weight, and more preferably 46 to 56% by weight.

In obtaining the above-mentioned copolymer, examples of the above-mentioned acrylic ester and methacrylic acid ester include methyl acrylate, methyl methacrylate, ethyl acrylate, ethyl methacrylate, propyl acrylate, propyl methacrylate, n-butyl acrylate, n-butyl methacrylate, hexyl acrylate, hexyl methacrylate, 2-ethylhexyl acrylate, 2-ethylhexyl methacrylate, 2-hydroxymethyl acrylate, 2-hydroxymethyl methacrylate, 2-hydroxyethyl acrylate, 2-hydroxyethyl methacrylate, and the like. Among these, methyl acrylate and methyl methacrylate are particularly preferred.

Further, examples of the above-mentioned aromatic vinyl include styrene, methylstyrene, chlorostyrene, divinylbenzene, and the like. Among these, styrene is particularly preferred.

In the hydrogen absorbing alloy electrode according to the present invention, when the amount of the above-mentioned copolymer in the hydrogen absorbing alloy electrode is too small, binding between each hydrogen absorbing alloy powder is degraded, resulting in insufficient contact between each hydrogen absorbing alloy powder and between the hydrogen absorbing alloy powder and the current collector. On the other hand, when the amount of the above-mentioned copolymer is too large, the copolymer presents between each hydrogen absorbing alloy powder in excess, thereby preventing sufficient contact between each hydrogen absorbing alloy powder. In either one of the cases, resistance in the hydrogen absorbing alloy electrode is increased, thereby decreasing a discharge voltage in a case where the nickel-metal hydride battery employing the hydrogen absorbing alloy electrode is discharged at a high current. Therefore, the content of the above-mentioned copolymer in the hydrogen absorbing alloy electrode is preferably set in the range of 0.2 to 1.0% by weight based on the weight of the hydrogen absorbing alloy powder.

The above-mentioned copolymer may contain impurities and the like. It is thus preferable to heat-treat the copolymer so that the impurities and the like contained therein is evaporated to be removed. However, when the temperature at which the copolymer is heat-treated is too high, molecular chains in the copolymer may be separated. Therefore, it is preferable to heat-treat the above-mentioned copolymer at temperatures in the range of 100 to 180° C.

When the copolymer is heat-treated to remove the impurities and the like contained therein as described above, the contact between each hydrogen absorbing alloy powder is further enhanced, whereby a discharge voltage in a case where the battery is discharged at a high current is further increased.

As the above-mentioned copolymer, it is preferable to use a copolymer having a glass transition point (Tg) of not less than 10° C. At temperatures lower than this glass transition point, the copolymer is in a hard state like glass and hence, hydrogen absorbing alloy powder can be firmly retained in the hydrogen absorbing alloy electrode by the binding agent. Accordingly, even in a case where a nickel-metal hydride battery is discharged under low temperature conditions, the battery can be discharged at a high voltage.

It should be noted here that the type of hydrogen absorbing alloy to be used in the hydrogen absorbing alloy electrode according to the present invention is not particularly limited. Examples of a usable hydrogen absorbing alloy include a misch metal nickel hydrogen absorbing alloy; Zr—Ni type hydrogen absorbing alloy such as ZrNi; Ti—Fe type hydrogen absorbing alloy such as TiFe; Zr—Mn type hydrogen absorbing alloy such as $ZrMn_2$; Ti—Mn type hydrogen absorbing alloy such as $TiMn_{1.5}$; and Mg—Ni type hydrogen absorbing alloy such as $Mg_2Ni$.

Such hydrogen absorbing alloys may be fabricated by a conventionally known method, for example, a melt-quenching method, an atomizing method, and a high-frequency melting method.

As the above-mentioned misch metal nickel hydrogen absorbing alloy, for example, the one represented by a constitutional formula of $MmNi_aCo_bAl_cMn_d$ can be used. In the constitutional formula, Mm denotes a mixture of elements selected from the group consisting of La, Ce, Pr, Nd, Sm, Eu, Sc, Y, Pm, Gd, Tb, Dy, Ho, Er, Tm, Yb, and Lu. Particularly, it is preferable that Mm comprises a mixture mainly containing elements selected from the group consisting of La, Ce, Pr, Nd, and Sm. Further, the above-mentioned a, b, c, and d, which represent an atomic ratio, satisfy the conditions of a>0, b>0, c>0, d≧0, and 4.4≦a+b+c+d≦5.4, and preferably further satisfies the conditions of 2.8≦a≦5.2, 0<b≦1.4, 0<c≦1.2, and d≦1.2. Furthermore, it is preferable that the above-mentioned c and d satisfy the conditions of c≦1.0 and d≦1.0 in order to increase a battery capacity of a nickel-metal hydride battery.

When the particle diameter of the above-mentioned hydrogen absorbing alloy powder is too small, the surface area of the hydrogen absorbing alloy powder becomes large, whereby the surface of the hydrogen absorbing alloy powder is liable to be oxidized. When the surface of the hydrogen absorbing alloy powder is oxidized, the hydrogen absorbing alloy powder can not achieve sufficient electrical contact with each other, resulting in degraded conductivity of the hydrogen absorbing alloy electrode. On the other hand, when the particle diameter of the above-mentioned hydrogen absorbing alloy powder is too large, the surface area of the hydrogen absorbing alloy powder becomes small, whereby the area involved in the reaction is decreased. Accordingly, in either one of the cases, overpotential in the nickel-metal hydride battery is increased, thereby decreasing a discharge voltage in a case where the battery is discharged at a high current. It is thus preferable to use hydrogen absorbing alloy powder having an average particle diameter in the range of 10 to 70 μm.

Further, in fabricating a hydrogen absorbing alloy electrode by applying a paste prepared by mixing the above-mentioned hydrogen absorbing alloy powder and binding agent to a current collector, a thickener comprising a water soluble high polymer such as polyethylene oxide is preferably added to the above-mentioned paste so as to facilitate uniform application of the paste to the current collector.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
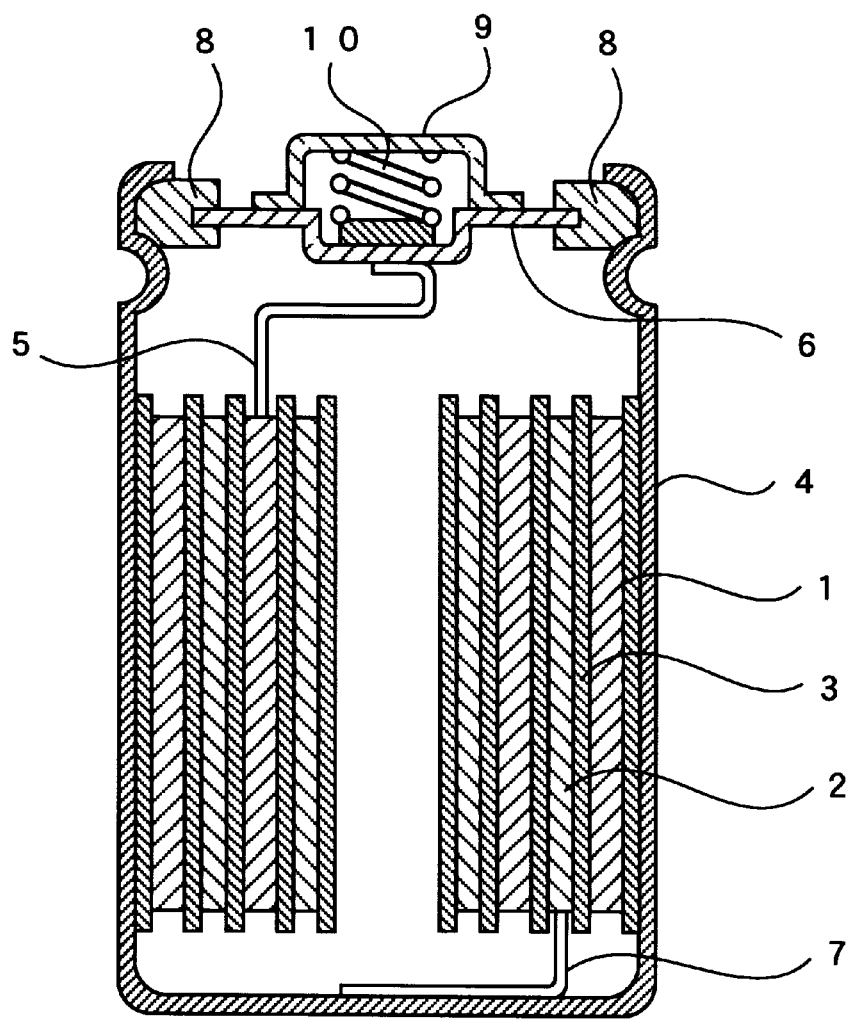
FIG. 1 is a schematic sectional view showing the internal construction of each of nickel-metal hydride batteries fabricated in examples and comparative examples of the present invention.

Hydrogen absorbing alloy electrodes and nickel-metal hydride batteries according to examples of the present invention will be specifically described, and comparative examples will be taken to make it clear that in each of the nickel-metal hydride batteries according to the examples, a high-rate discharge voltage is increased, charge/discharge cycle performance is improved, and internal pressure is prevented from rising. It should be appreciated that the hydrogen absorbing alloy electrode and nickel-metal hydride battery according to the invention are not particularly limited to those in the following examples, and various changes and modifications may be made in the invention without departing from the spirit and scope thereof.

EXAMPLE 1

In the example 1, in obtaining hydrogen absorbing alloy powder to be used as an active material, Misch metal (Mm), which is a mixture of rare earth elements, Ni, Co, Al, and Mn were mixed together in the molar ratio of 1.0:3.4:0.8:0.3:0.5. A mixture obtained was melted by a high-frequency heating induction furnace, and was then cooled and ground. Subsequently, the mixture thus ground was passed through a sieve of 100 mesh, to obtain powder, having an average particle diameter of about 60 $\mu$m, of a hydrogen absorbing alloy represented by a constitutional formula of $MmNi_{3.4}Co_{0.8}Al_{0.3}M_{0.5}$.

On the other hand, in fabricating a copolymer to be used as a binding agent, sodium dodecylbenzenesulfonate is used as a emulsifying agent to emulsion-polymerize methyl acrylate, methyl methacrylate, and styrene. Thus was obtained a copolymer in which methyl acrylate units and methyl methacrylate units were contained in the weight ratio of 1:1 and the total content of the methyl acrylate units and methyl methacrylate units is 43% by weight of the whole copolymer.

Then, 0.1 part by weight of an aqueous solution containing 50% by weight of the above-mentioned copolymer was added to 10 parts by weight of the above-mentioned hydrogen absorbing alloy powder in such a manner that the copolymer was present in a proportion of 0.5% by weight based on the weight of the hydrogen absorbing alloy powder. Subsequently, 1 part by weight of a 5% by weight polyethylene oxide (PEO) aqueous solution as a thickener was further added to prepare a paste. The paste thus obtained was applied to a current collector composed of a punching metal which was nickel-plated iron, followed by drying at 60° C. for 30 minutes. The current collector having the paste applied thereto was then rolled, to obtain a hydrogen absorbing alloy electrode.

The hydrogen absorbing alloy electrode fabricated in the above-mentioned manner was used as a negative electrode while a sintered-type nickel electrode was used as a positive electrode, to fabricate a nickel-metal hydride battery having a battery capacity of 1200 mA which is of AA size and of a positive electrode control type, as shown in FIG. 1.

In fabricating the nickel-metal hydride battery, as shown in FIG. 1, a nylon separator 3 was interposed between the above-mentioned positive electrode 1 and negative electrode 2, and they were spirally wound and contained in a battery can 4, after which a 30% by weight potassium hydroxide aqueous solution was pored as an alkaline electrolyte into the battery can 4, and the battery can 4 was sealed, to connect the positive electrode 1 to a positive electrode cover 6 through a positive electrode lead 5 as well as to connect the negative electrode 2 to the battery can 4 through a negative electrode lead 7 so that the battery can 4 and the positive electrode cover 6 would be electrically separated from each other by an insulating packing 8. Further, a coil spring 10 was provided between the positive electrode cover 6 and a positive electrode external terminal 9. When the internal pressure of the battery exceeded a predetermined pressure, the coil spring 10 was compressed, so that gas inside the battery was released in the air.

EXAMPLES 2 to 8

In each of the examples 2 to 8, in fabricating a copolymer to be used as a binding agent, the ratio of the methyl acrylate, methyl methacrylate, and styrene in the above-mentioned example 1 was changed. Specifically, copolymers according to the present examples contained acrylic ester units and methacrylic acid ester units in the weight ratio of 1:1, and the total contents of the methyl acrylate units and methyl methacrylate units in the copolymers were respectively set to 46% by weight in the example 2; 50% by weight in the example 3; 53% by weight in the example 4; 56% by weight in the example 5; 60% by weight in the example 6; 70% by weight in the example 7; and 90% by weight in the example 8, as shown in the following Table 1.

Except that the above-mentioned each copolymer was used as a binding agent, each hydrogen absorbing alloy electrode was fabricated in such a manner that the copolymer was present in a proportion of 0.5% by weight based on the weight of the hydrogen absorbing alloy powder, as in the case of the above-mentioned example 1. Each nickel-metal hydride battery in the examples 2 to 8 was fabricated using as its negative electrodes each of the hydrogen absorbing alloy electrode thus fabricated.

Comparative Examples 1 and 2

In the comparative examples 1 and 2, in fabricating a copolymer to be used as a binding agent, the ratio of the methyl acrylate, methyl methacrylte, and styrene in the above-mentioned example 1 was changed. Specifically, copolymers in the present comparative examples contained methyl acrylate units and methyl methacrylate units in the weight ratio of 1:1, and the total contents of the methyl acrylate units and methyl methacrylate units in the copolymers were respectively set to 40% by weight in the comparative example 1; and 95% by weight in the comparative example 2, as shown in the following Table 1.

Except that the above-mentioned each copolymer was used as a binding agent, each hydrogen absorbing alloy electrode was fabricated in such a manner that the copolymer was present in a proportion of 0.5% by weight based on the weight of the hydrogen absorbing alloy powder, as in the case of the above-mentioned example 1. Each nickel-metal hydride battery in the comparative examples 1 and 2 was fabricated using as its negative electrode each of the hydrogen absorbing alloy electrodes thus fabricated.

Comparative Example 3

In the comparative example 3, used as a binding agent was a copolymer obtained by copolymerizing methyl methacrylate, styrene, butadiene, and itaconic acid in the weight ratio of 15:45:38:2. It should be noted here that this copolymer is equivalent to the binder for use in a hydrogen absorbing alloy electrode, which is disclosed in the above-mentioned Japanese Patent Laid-Open No. Heil0(1998)-241693.

Except that the above-mentioned copolymer was used as a binding agent, a hydrogen absorbing alloy electrode was fabricated in such a manner that the copolymer was present in a proportion of 0.5% by weight based on the weight of the hydrogen absorbing alloy powder, as in the case of the above-mentioned example 1. A nickel-metal hydride battery in the comparative example 3 was fabricated using as its negative electrode the hydrogen absorbing alloy electrode thus fabricated.

Each of the nickel-metal hydride batteries according to the above-mentioned examples 1 to 8 and comparative examples 1 to 3 was charged for 16 hours at a charging current of 120 mA at room temperature, was then kept at 60° C. for 24 hour, and was discharged to a discharge end voltage of 1.0 V at a discharging current of 120 mA at room temperature, so that each of the batteries was activated.

Subsequently, each of the nickel-metal hydride batteries in the examples 1 to 8 and comparative examples 1 to 3 thus activated was charged for 12 hours at a charging current of 120 mA (0.1 C) at room temperature and was then discharged to the depth of discharge of 80% at a discharging current of 400 mA (⅓ C). Thereafter, each of the batteries was discharged for 30 seconds at a high discharging current of 3600 mA (3 C), to measure a discharge voltage at this time. In determining the discharge voltage of each battery, the test was conducted with respect to four nickel-metal hydride batteries, and the average value thereof was shown as a high-rate discharge voltage in the following Table 1.

Each of the nickel-metal hydride batteries according to the above-mentioned examples 1 to 8 and comparative examples 1 to 3 activated in the above-mentioned manner was charged for 16 hours at a charging current of 120 mA and was then discharged to a discharge end voltage of 1.0 V at a discharging current of 1200 mA. A discharge capacity at this time was measured as an initial capacity.

Then, each of the nickel-metal hydride batteries according to the above-mentioned examples 1 to 8 and comparative examples 1 to 3 whose initial capacity was thus measured was overcharged at a charging current of 1200 mA until the peak value of the battery voltage fell by 10 mV and was then discharged to a discharge end voltage of 1.0 V at a discharging current of 1200 mA. Charge/discharge cycle tests were carried out with the above-mentioned charge and discharge taken as one cycle, so as to determine the number of cycles until the discharge capacity of each battery fell to 80% of the above-mentioned initial discharge capacity. In determining the number of cycles in each battery, the test was conducted with respect to ten nickel-metal hydride batteries, and the average value thereof was shown as charge/discharge cycle performance in the following Table 1.

Further, each of the nickel-metal hydride batteries according to the above-mentioned examples 1 to 8 and comparative examples 1 to 3 whose initial capacity was measured in the above-mentioned manner was charged at a charging current of 1200 mA, to measure the time period elapsed from the start of the charging until the internal pressure of the battery reaches 10 kgf /cm$^2$ was measured. In determining the time period in each battery, the test was conducted with respect to four nickel-metal hydride batteries, and the average value thereof was shown as internal pressure characteristics in the following Table 1.

TABLE 1

| | total content of methyl acrylate units and methyl methacrylate units in copolymer (wt %) | high-rate discharge voltage (V) | charge/ discharge cycle performance (number of cycle) | internal pressure characteristics (minute) |
| --- | --- | --- | --- | --- |
| example 1 | 43 | 1.105 | 580 | 103 |
| example 2 | 46 | 1.110 | 590 | 122 |
| example 3 | 50 | 1.115 | 600 | 122 |
| example 4 | 53 | 1.116 | 600 | 121 |
| example 5 | 56 | 1.118 | 610 | 120 |
| example 6 | 60 | 1.120 | 620 | 117 |
| example 7 | 70 | 1.125 | 640 | 114 |
| example 8 | 90 | 1.115 | 600 | 103 |
| comparative example 1 | 40 | 1.078 | 500 | 72 |
| Comparative example 2 | 95 | 1.080 | 560 | 77 |
| Comparative example 3 | 15 | 1.060 | 400 | 60 |

As apparent from the results, in each of the nickel-metal hydride batteries in the examples 1 to 8 employing as the binding agent the copolymer of methyl acrylate, methyl methacrylate, and styrene, in which the total content of the methyl acrylate units and methyl methacrylate units was in the range of 43 to 90% by weight, the high-rate discharge voltage was increased, the charge/discharge cycle performance was improved, and the internal pressure was prevented from rising, as compared with those in the nickel-metal hydride battery in the comparative example 1 employing the copolymer in which the total content of the methyl acrylate units and methyl methacrylate units was 40% by weight, in the nickel-metal hydride battery in the comparative example 2 employing the copolymer in which the total content of the methyl acrylate units and methyl methacrylate units was 95% by weight, and in the nickel-metal hydride battery in the comparative example 3 employing the copolymer containing butadiene.

Further, when the nickel-metal hydride batteries in the examples 1 to 8 were compared with each other, it was found that in each of the nickel-metal hydride batteries in the examples 3 to 8 employing the copolymer in which the total content of the methyl acrylate units and methyl methacrylate units was in the range of 50 to 90% by weight, the discharge voltage in a case where the battery was discharged at a high current was increased and the charge/discharge cycle performance was improved. Particularly, in each of the nickel-metal hydride batteries in the examples 5 to 7 employing the copolymer wherein the total content of the methyl acrylate units and methyl methacrylate units was in the range of 56 to 70% by weight, the discharge voltage in a case where the battery was discharged at a higher current was increased and the charge/discharge cycle performance was further improved.

Furthermore, it was found that in each of the nickel-metal hydride batteries in the examples 2 to 7 employing the copolymer in which the total content of the methyl acrylate units and methyl methacrylate units was in the range of 46 to 70% by weight, the internal pressure was prevented from rising in a case where the battery was overcharged. Particularly, in each of the nickel-metal hydride batteries in the examples 2 to 5 employing the copolymer in which the total content of the methyl acrylate units and methyl methacrylate units was in the range of 46 to 56% by weight, the internal pressure was further prevented from rising in a case where the battery was overcharged.

EXAMPLES 9 to 13

In each of the examples 9 to 13, used as a binding agent was a copolymer of methyl acrylate, methyl methacrylate, and styrene. As in the case of the above-mentioned example 7, the copolymer contained methyl acrylate units and methyl methacrylate units in the weight ratio of 1:1 and the total content of the methyl acrylate units and methyl methacrylate units in the copolymer was 70% by weight.

In each of the examples 9 to 13, in fabricating hydrogen absorbing alloy electrode with the above-mentioned copolymer as a binding agent, the proportion of the copolymer to the hydrogen absorbing alloy in the above-mentioned example 7 was changed. Specifically, the copolymers according to the present examples were respectively present in proportions of 0.1% by weight in the example 9; 0.2% by weight in the example 10; 0.7% by weight in the example 11; 1.0% by weight in the example 12; and 1.2% by weight in the example 13, based on the weight of the hydrogen absorbing alloys, as shown in the following Table 2. Except for the above, hydrogen absorbing alloy electrodes were fabricated in the same manner as that in the above-mentioned example 7.

Then, nickel-metal hydride batteries of the examples 9 to 13 were fabricated in the same manner as that in the above-mentioned example 1, using as their negative electrodes the hydrogen absorbing alloy electrodes thus fabricated.

With respect to the nickel-metal hydride batteries in the examples 9 to 13, a high-rate discharge voltage was measured in the same manner as that in the above-mentioned examples 1 to 8 and comparative examples 1 to 3. The results, along with that of the above-mentioned example 7, are shown in the following Table 2.

TABLE 2

| | example | | | | | |
|---|---|---|---|---|---|---|
| | 9 | 10 | 7 | 11 | 12 | 13 |
| proportion of copolymer (wt %) | 0.1 | 0.2 | 0.5 | 0.7 | 1.0 | 1.2 |
| high-rate discharge voltage (V) | 1.090 | 1.116 | 1.125 | 1.118 | 1.116 | 1.100 |

As apparent from the results, when the nickel-metal hydride batteries in the examples 7 and 9 to 13 were compared with each other, it was found that in each of the nickel-metal hydride batteries in the examples 7 and 10 to 12 employing the hydrogen absorbing alloy electrode in which the copolymer was present in a proportion of 0.2 to 1.0% by weight based on the weight of the hydrogen absorbing alloy, the high-rate discharge voltage was further increased as compared with that in the nickel-metal hydride battery in the example 9 employing the hydrogen absorbing alloy electrode in which the copolymer was present in a proportion of 0.1% by weight based on the weight of the hydrogen absorbing alloy, and the nickel-metal hydride battery in the example 13 employing the hydrogen absorbing alloy electrode in which the copolymer was present in a proportion of 1.2% by weight based on the weight of the hydrogen absorbing alloy.

EXAMPLES 14 to 20

In each of the examples 14 to 20, used as a binding agent was the same copolymer of methyl acrylate, methyl methacrylate, and styrene as that in the above-mentioned example 7. The copolymer contained methyl acrylate units and methyl methacrylate units in the weight ratio of 1:1 and the total content of the methyl acrylate units and methyl methacrylate units in the copolymer was 70% by weight. A paste was prepared in such a manner that the copolymer was present in a proportion of 0.5% by weight based on the weight of the hydrogen absorbing alloy, and the paste thus prepared was applied to a current collector composed of a punching metal which was nickel-plated iron, followed by drying at 60° C. for 30 minutes, as in the case of the above-mentioned example 1.

Then, in the present examples, the current collectors which were coated with the pastes thus dried were respectively heat-treated for 1 hour at 80° C. in the example 14; at 90° C. in the example 15; at 100° C. in the example 16; at 110° C. in the example 17; at 120° C. in the example 18; at 180° C. in the example 19; and at 200° C. in the example 20, to obtain hydrogen absorbing alloy electrodes.

Subsequently, nickel-metal hydride batteries in the examples 14 to 20 were fabricated in the same manner as that in the above-mentioned example 1, using as their negative electrodes the hydrogen absorbing alloy electrodes thus fabricated.

With respect to the nickel-metal hydride batteries in the examples 14 to 20, a high-rate discharge voltage was measured in the same manner as that in the above-mentioned examples 1 to 8 and comparative examples 1 to 3. The results, along with that of the above-mentioned example 7, are shown in the following Table 3.

TABLE 3

| | heat-treating temperature (° C.) | high-rate discharge voltage (V) |
|---|---|---|
| example 7 | no heat treatment | 1.125 |
| example 14 | 80 | 1.126 |
| example 15 | 90 | 1.128 |
| example 16 | 100 | 1.135 |
| example 17 | 110 | 1.136 |
| example 18 | 120 | 1.134 |
| example 19 | 180 | 1.132 |
| example 20 | 200 | 1.126 |

As apparent from the results, when the nickel-metal hydride batteries in the examples 7 and 14 to 20 were compared with each other, it was found that in each of the nickel-metal hydride batteries in the examples 16 to 19 employing the hydrogen absorbing alloy electrode in which the copolymer of methyl acrylate, methyl methacrylate, and styrene as the binding agent was heat-treated at temperatures in the range of 100 to 180° C., the high-rate discharge voltage was further increased, as compared with that in the nickel-metal hydride battery in the example 7 employing the hydrogen absorbing alloy electrode in which the above-mentioned copolymer was not heat-treated, in each of the nickel-metal hydride batteries in the examples 14 and 15 employing the hydrogen absorbing alloy electrode in which the above-mentioned copolymer was heat-treated at temperatures less than 100° C., and in the nickel-metal hydride battery in the example 20 employing the hydrogen absorbing alloy electrode in which the above-mentioned copolymer was heat-treated at temperatures over 180° C.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. A hydrogen absorbing alloy electrode containing hydrogen absorbing alloy powder and a binding agent, wherein said binding agent is a copolymer of aromatic vinyl and at least one of acrylic ester and methacrylic acid ester, in which the total content of acrylic ester units and methacrylic acid ester units is in the range of 43 to 90% by weight of the whole copolymer, wherein the hydrogen absorbing alloy powder and binding agent are heat-treated after mixing and drying.

2. The hydrogen absorbing alloy electrode according to claim 1, wherein the total content of acrylic ester units and methacrylic acid ester units in said copolymer is in the range of 50 to 90% by weight.

3. The hydrogen absorbing alloy electrode according to claim 1, wherein the total content of acrylic ester units and methacrylic acid ester units in said copolymer is in the range of 56 to 70% by weight.

4. The hydrogen absorbing alloy electrode according to claim 1, wherein the total content of acrylic ester units and methacrylic acid ester units in said copolymer is in the range of 46 to 70% by weight.

5. The hydrogen absorbing alloy electrode according to claim 1, wherein said copolymer is present in a proportion of 0.2 to 1.0% by weight based on the weight of said hydrogen absorbing alloy powder.

6. The hydrogen absorbing alloy electrode according to claim 1, wherein said hydrogen absorbing alloy powder and binding agent are heat-treated at temperatures in the range of 100 to 180° C.

7. The hydrogen absorbing alloy electrode according to claim 1, wherein said hydrogen absorbing alloy powder is powder of a misch metal nickel hydrogen absorbing alloy.

8. The hydrogen absorbing alloy electrode according to claim 7, wherein said misch metal nickel hydrogen absorbing alloy is represented by a constitutional formula of $MmNi_aCo_bAl_cMn_d$ (wherein Mm denotes a mixture of elements selected from the group consisting of La, ce, Pr, Nd, Sm, Eu, Sc, Y, Pm, Gd, Tb, Dy, Ho, Er, Tm, Yb, and Lu, and said a, b, c, and d, which represent an atomic ratio, satisfies the conditions of $4.4 \leq a+b+c+d \leq 5.4$, $2.8 \leq a \leq 5.2$, $0 < b \leq 1.4$, $0 < c \leq 1.2$, and $0 \leq d \leq 1.2$).

9. The hydrogen absorbing alloy electrode according to claim 1, wherein said hydrogen absorbing alloy powder has an average particle diameter in the range of 10 to 70 $\mu$m.

10. The hydrogen absorbing alloy electrode according to claim 1, wherein said acrylic ester used in said copolymer is methyl acrylate.

11. The hydrogen absorbing alloy electrode according to claim 1, wherein said methacrylic acid ester used in said copolymer is methyl methacrylate.

12. The hydrogen absorbing alloy electrode according to claim 1, wherein said aromatic vinyl used in said copolymer is styrene.

13. A nickel-metal hydride battery employing as its negative electrode the hydrogen absorbing alloy electrode according to claim 1.

* * * * *